March 21, 1961 W. W. FUNK 2,975,543
APPARATUS FOR DISTRIBUTING POWDERED MATERIAL
Filed July 10, 1957 6 Sheets-Sheet 1
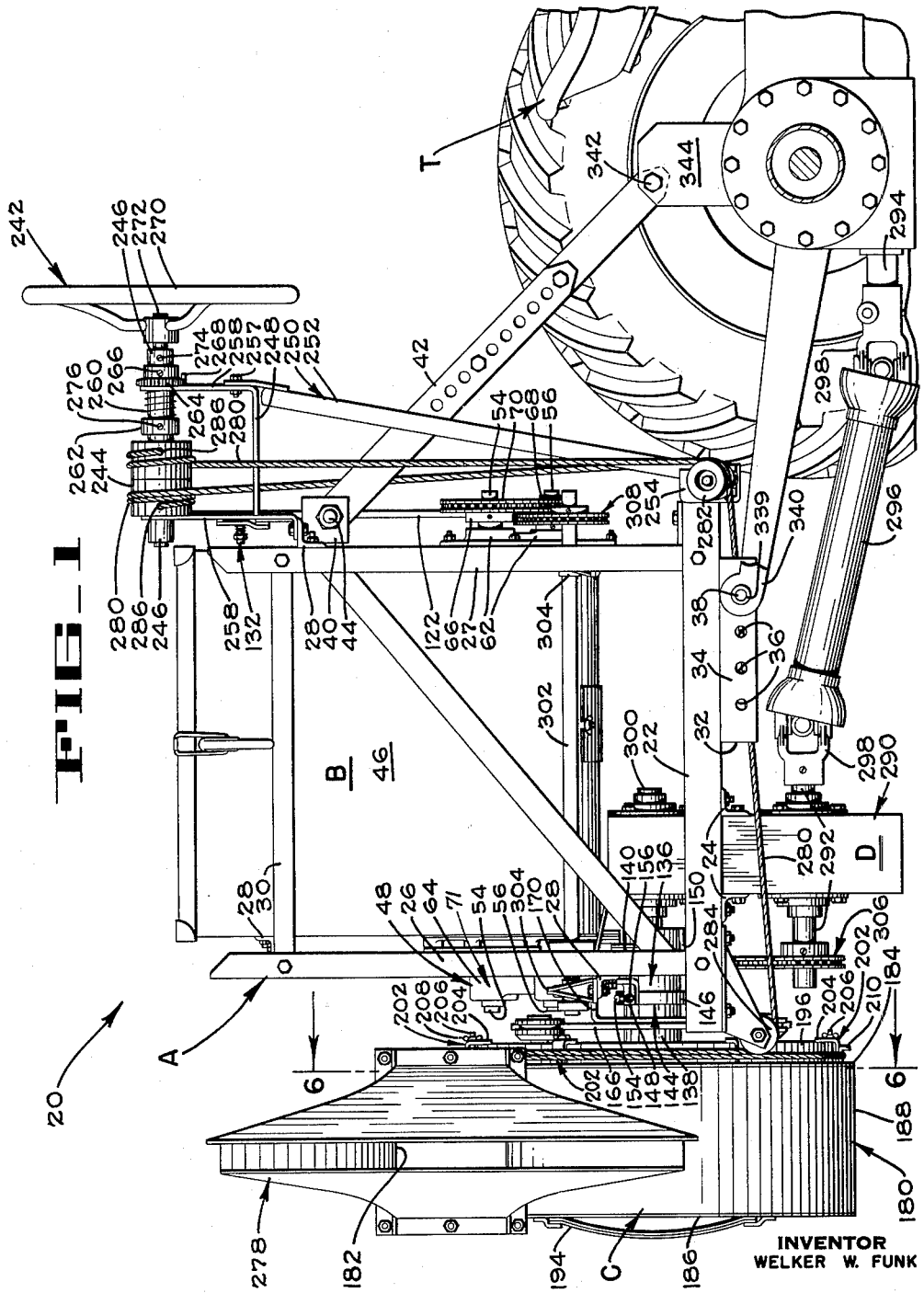
INVENTOR
WELKER W. FUNK
BY
ATTORNEY

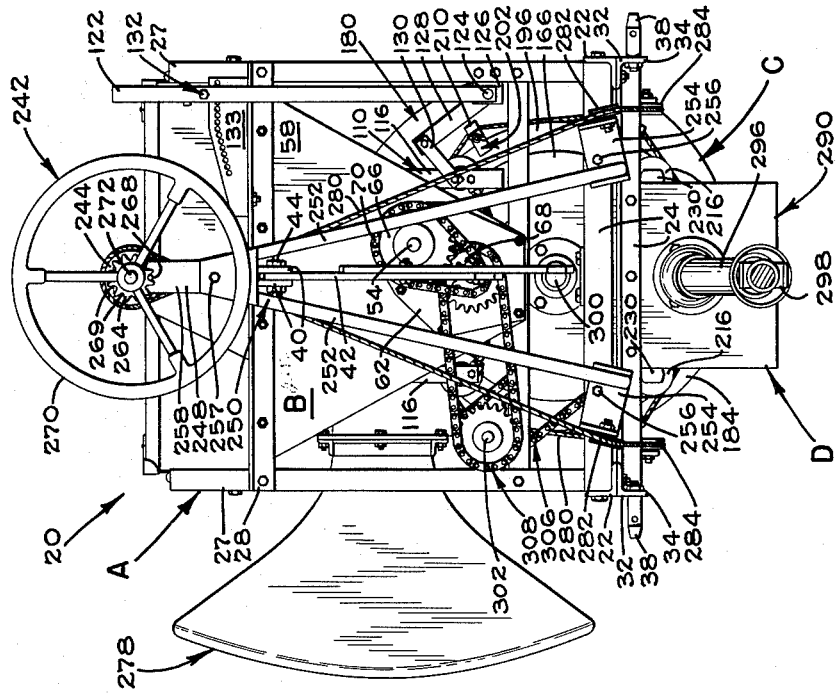

March 21, 1961  W. W. FUNK  2,975,543
APPARATUS FOR DISTRIBUTING POWDERED MATERIAL
Filed July 10, 1957  6 Sheets-Sheet 3
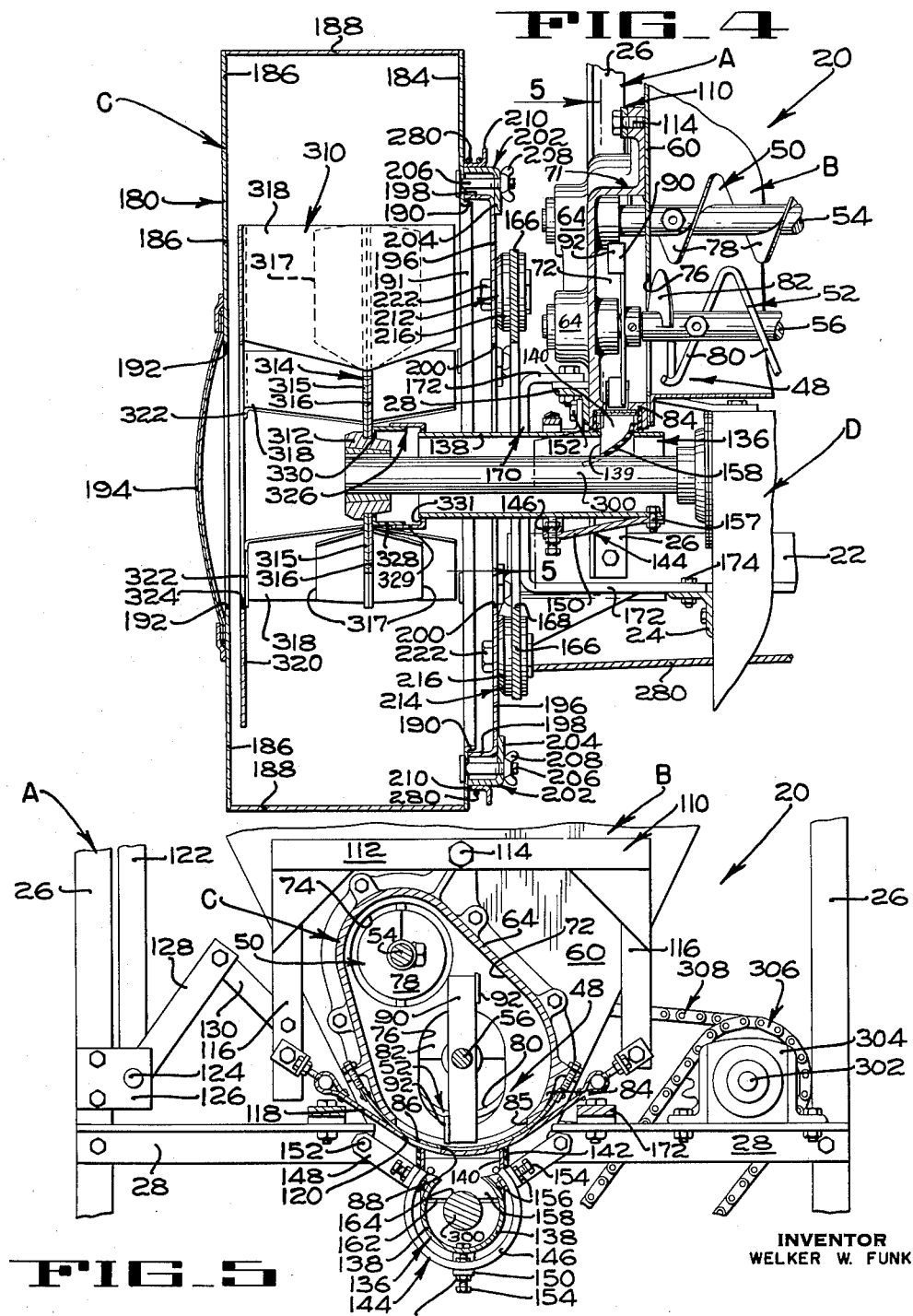
INVENTOR
WELKER W. FUNK
BY Hans G. Hoffmeister
ATTORNEY

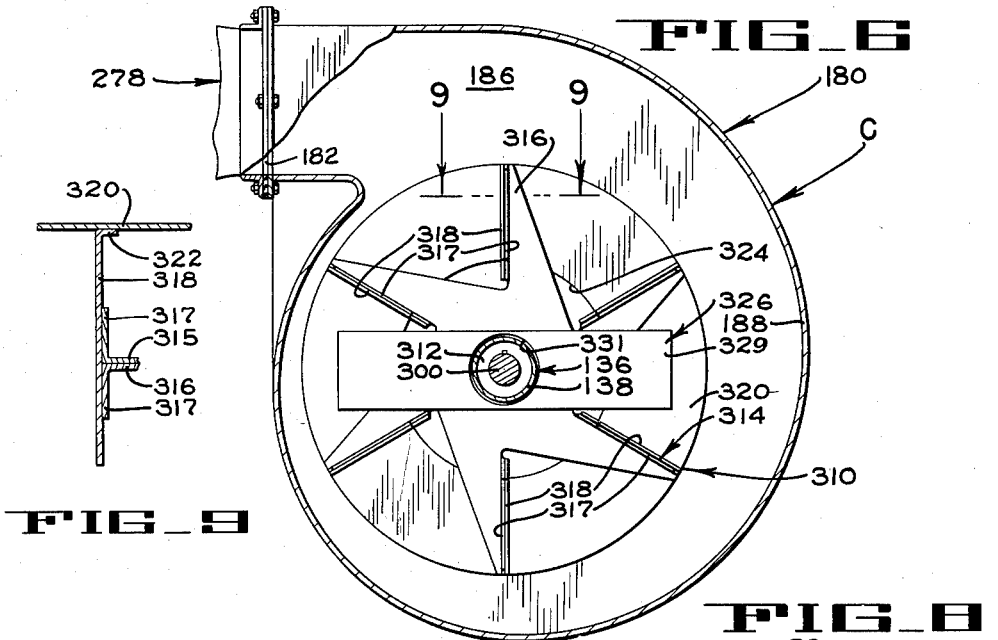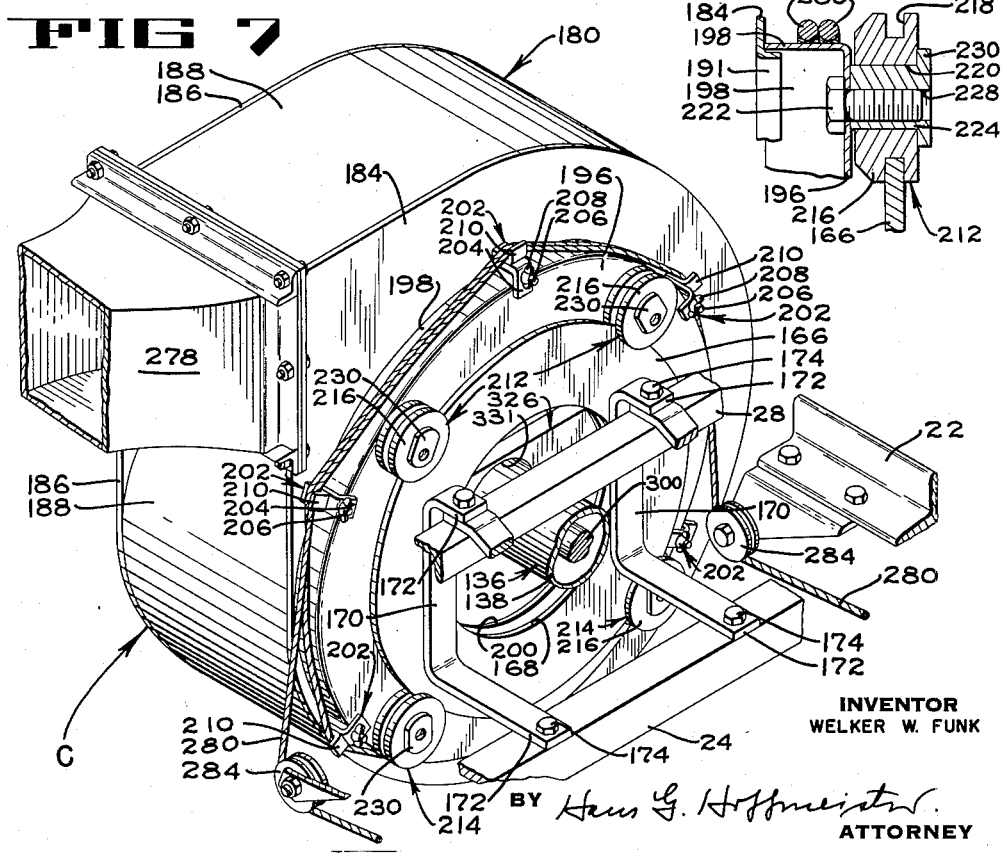

March 21, 1961  W. W. FUNK  2,975,543
APPARATUS FOR DISTRIBUTING POWDERED MATERIAL
Filed July 10, 1957  6 Sheets-Sheet 5
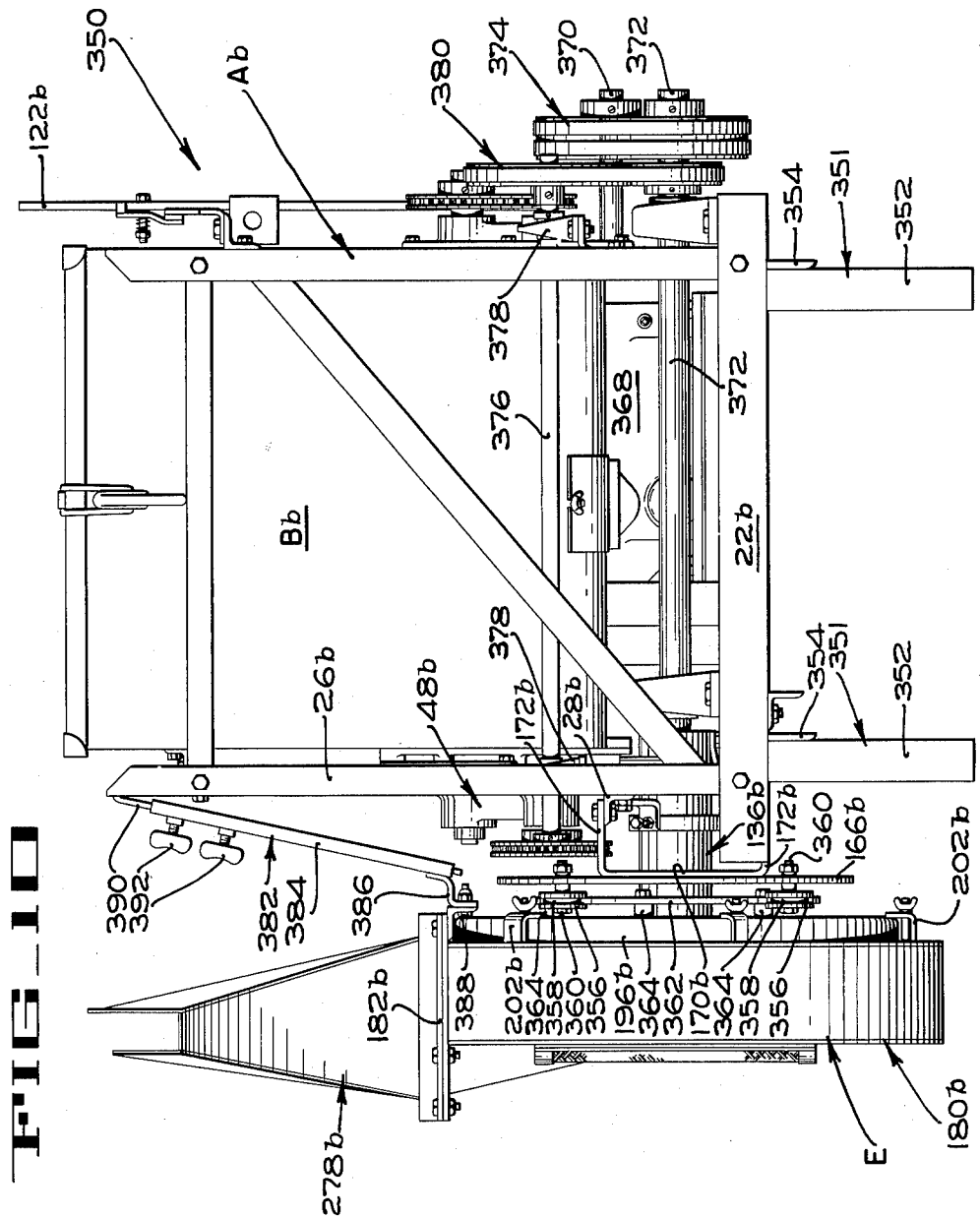
INVENTOR
WELKER W. FUNK
BY Hans G. Hoffmeister
ATTORNEY

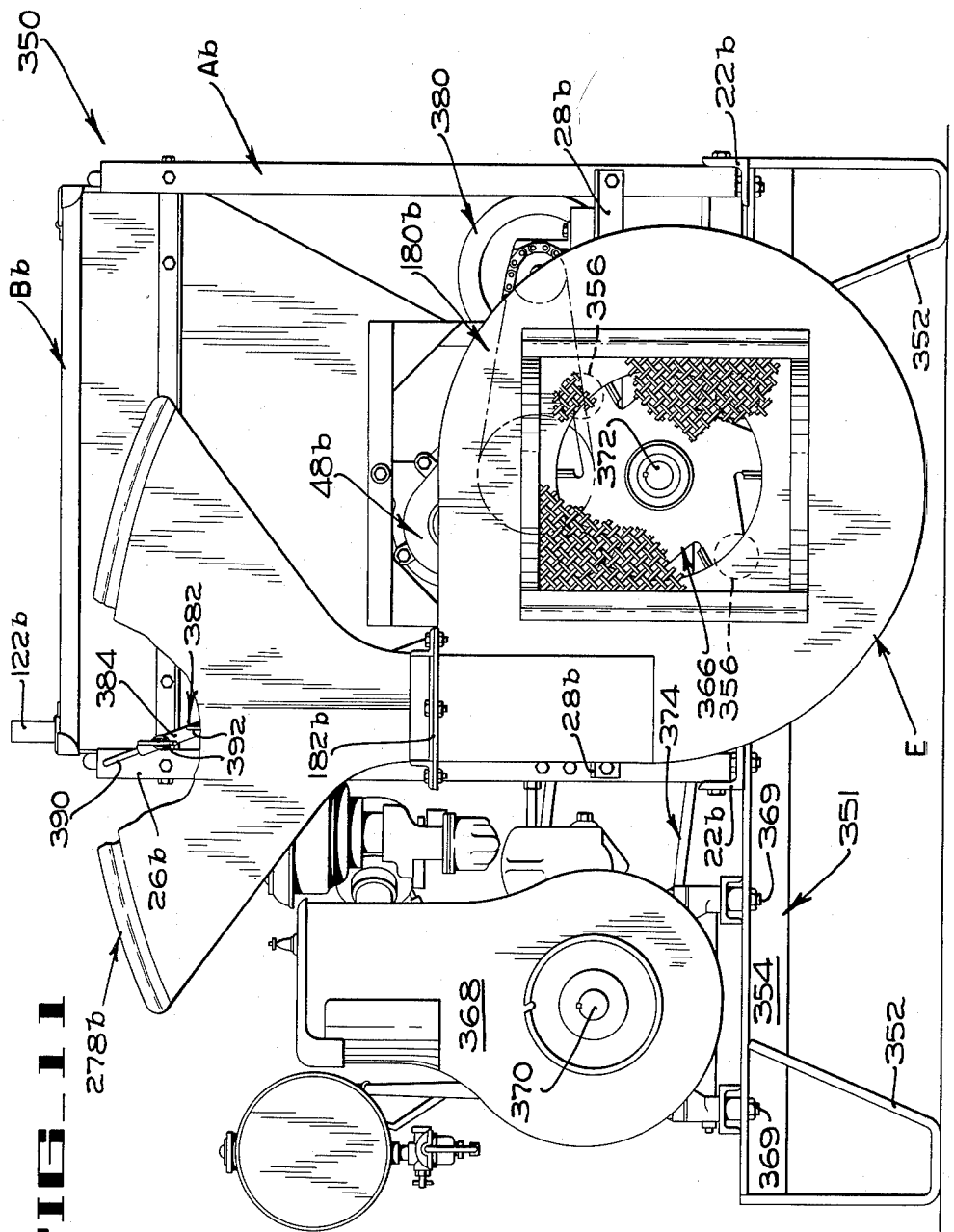

UnitedStates Patent Office 2,975,543
Patented Mar. 21, 1961

2,975,543
APPARATUS FOR DISTRIBUTING POWDERED MATERIAL
Welker W. Funk, Medina, N.Y., assignor to Food Machinery and Chemical Corporation, San Jose, Calif., a corporation of Delaware
Filed July 10, 1957, Ser. No. 670,952
22 Claims. (Cl. 43—148)

The present invention relates to apparatus for distributing powdered material and pertains more particularly to means for controlling the flow of powdered material through such apparatus and the discharge of the material therefrom.

It is an object of the present invention to provide an improved apparatus for distributing powdered materials, such as pesticides.

Another object of the present invention is to provide an adjustable blower housing for apparatus of the above-mentioned type.

Another object is to provide an improved impeller for a blower of a distributing apparatus.

Another object is to provide improved mounting means for a blower housing of a pesticide distributor.

Another object is to provide adjusting and retaining means for a movably mounted blower housing in a powdered material distributing apparatus.

Another object is to provide improved means for conducting pesticides from a supply thereof to the blower in a pesticide distributor.

These and other objects and advantages will become apparent from the following description taken in connection with the accompanying drawings in which:

Fig. 1 is a side view of the apparatus of the present invention and including a part of a tractor on which the apparatus is mounted.

Figs. 2 and 3 are rear and front views, respectively, of the apparatus of Fig. 1, shown at a reduced scale.

Fig. 4 is a fragmentary longitudinal, vertical section taken along the line 4—4 of Fig. 2 showing the blower and related structure at an enlarged scale.

Fig. 5 is a fragmentary transverse, vertical section taken along the lines 5—5 of Fig. 4 showing a portion of the dust conducting mechanism with certain parts being broken away.

Fig. 6 is a fragmentary transverse section through the blower of the present invention shown at an enlarged scale and taken along line 6—6 of Fig. 1.

Fig. 7 is a fragmentary perspective of the blower shown in Fig. 6 as viewed from above and from the front side thereof.

Fig. 8 is an enlarged detail of a blower mounting roller taken along line 8—8 of Fig. 2.

Fig. 9 is an enlarged section taken on line 9—9 of Fig. 6.

Figs. 10 and 11 are side and rear views, respectively, of a modified embodiment of the present invention.

Referring to Fig. 1, the present powdered material distributing apparatus 20 comprises a material supply hopper B mounted in a frame structure A. Finely divided chemical powder of suitable composition, such as a pesticide in dust form, is supplied to the hopper B from which it is conducted to a blower C that can be turned about a horizontal axis to a desired position of adjustment for directing and distributing the dust. The duster apparatus 20 is mounted on and powered by a tractor T, and power is delivered from the tractor T to various operating components of the duster apparatus 20 by means of a transmission D.

The frame structure A comprises two horizontal beams 22 (Figs. 1 and 2) which are disposed longitudinally of the apparatus at opposite sides of the frame and are rigidly interconnected by means of a plurality of other horizontal beams 24 which are disposed transversely of the frame. Two posts 26 and 27 which are spaced apart longitudinally of the beams 22 are fixed to each beam and project vertically upwardly therefrom. The posts 26 and 27 are interconnected by transversely extending tie bars 28 at the front and rear of the apparatus as well as by longitudinal tie bars 30 at the side of the frame.

At the front of the duster are two brackets 32 (Fig. 3), one of which is fixed to each of the beams 22. Each bracket has a vertical flange 34 projecting therebelow which is provided with a plurality of horizontally spaced apertures 36 (Fig. 1). The apertures 36 in the two flanges 34 are disposed in alignment transversely of the duster. Studs 38 (Fig. 3), one of which is disposed in each bracket 32, are located in a transversely aligned pair of the apertures 36 and project laterally of the duster beyond the frame structure.

Midway of the uppermost transverse tie bar 28 at the front of the duster 20 (Figs. 1 and 3) is a clevis 40. A longitudinally adjustable link 42, which functions in cooperation with the studs 38 to mount the duster on the tractor T, is pivotally attached to the clevis by means of a bolt 44. Lengthwise adjustment of the link 42 is accomplished in a well known manner.

The hopper B of the present crop duster apparatus 20 is disposed between the upright posts 26 and 27 and is supported by the various tie bars 28 and 30. At the bottom of the hopper B are two converging side walls 46 that form an elongated, V-shaped trough (Fig. 3) which is disposed longitudinally of the apparatus. As best shown in Figs. 4 and 5, a dust feed mechanism 48 associated with the hopper comprises two, spiral dust agitators 50 and 52. The agitators 50 and 52 are provided with support shafts 54 and 56, respectively, which extend between opposite end walls 58 and 60 of the hopper B and are rotatably disposed in front and rear bearings 62 and 64 (Fig. 1) which are mounted on the walls 58 and 60, respectively, exteriorly of the hopper. It will be noted that the ends of the shafts 54 and 56 project beyond the bearings 62 at the front of the apparatus and are provided with sprockets 66 and 68, respectively, of suitable pitch diameter. An endless chain 70 is trained around the sprockets to interconnect the agitators 50 and 52 for concurrent rotation in a common direction.

At the rear end of the hopper B a bracket 71 of which the bearings 64 are a part has a powder fluffing chamber 72 (Figs. 4 and 5) formed therein on the side adjacent the end wall 60. Both of the agitator shafts 54 and 56 project through radially enlarged apertures 74 and 76, respectively, in the wall 60 and across the fluffing chamber 72 to the bearings 64 of the bracket 71.

The agitator 50 is provided with a spirally trending fin 78 that extends, adjacent the rear end of the agitator, through the aperture 74. The manner in which the fin is wound about the shaft 54 causes the dust which the fin engages to be moved toward the front end of the hopper as the shaft 54 is rotated in a clockwise direction (Fig. 5). Since the rear end of the fin 78 is disposed in the fluffing chamber 72 such action of the agitator is also effective to advance any excess dust that may be in the chamber 72 from the chamber, through the aperture 74 and back into the hopper B.

The lowermost agitator 52, which is provided with a spirally trending rod 80 that is mounted in spaced relation to the shaft 56 for rotation therewith, urges dust in the hopper B toward the aperture 76 upon rotation of the agitator 52 in a clockwise direction (Fig. 5). Adjacent the aperture 76 and within the hopper B, the agitator 52 is provided with a short fin or blade 82. The fin 82, which is of spiral configuration, trends in the same direction as the rod 80 but has an effective length that is less than the length of a full convolution. Upon rotation of the agitator 52 in the direction indicated above, the spiral rod 80 functions to loosen the dust at the bottom of the hopper and urge it toward the aperture 76. While the spiral rod does not positively advance the dust, the short fin 82 of the agitator 52, upon each turn thereof, does positively advance a small amount of dust from the hopper B through the aperture 76 and into the chamber 72 in the rear bearing bracket 71.

It will be noted (Figs. 4 and 5) that at the bottom of the bearing bracket 71 in a lower wall 84 of the chamber 72 is an elongated, slotted opening 85. The wall of the chamber 72 in which the opening 85 is formed is arcuate in configuration and is disposed in substantial parallel relation with the shaft 56. A thin, elongated metal strap 86 is disposed exteriorly of the chamber 72 over the opening 85 in engagement with the outer surface of the wall 84. The strap 86, in which a dust discharge opening 88 is formed, is removably secured, in any convenient manner, in firm engagement with the wall 84 so that the discharge opening 88 thereof will be retained below the opening 85 in communication with the chamber 72.

Within the chamber 72 is a fluffer 90 that is mounted upon the agitator shaft 56 for rotation therewith. The fluffer 90 is provided with a plurality of peripherally disposed blades 92 which closely approach the strap 86 in the region of the dust discharge opening 88 upon rotation of the shaft 56. The blades 92 of the rotating fluffer 90 act to keep the dust in the fluffing chamber 72 in a somewhat fluid condition as the dust is supplied thereto by the fin 82 of the agitator 52. Additionally, each of the blades 92 positively discharges a portion of dust from the chamber 72 through the opening 88 in the strap 86 as the blades move past the strap at the bottom of the chamber.

An inverted U-shaped bracket 110 (Figs. 4 and 5) is pivotally mounted centrally of the bight 112 thereof by a bolt 114 on the bearing bracket 71. The bolt 114 is located adjacent the top of the bracket 71 substantially above the opening 88 of the chamber 72 so that legs 116 of the U-shaped bracket 110 are disposed at opposite sides of the bearing bracket 64. The legs 116 of the bracket 110 are disposed with their free ends adjacent the bottom of the fluffing chamber 72. Another elongated strap 118 of thin, flexible material, that is of substantially the same width as the strap 86, is located below the chamber 72 and is attached to the free ends of the legs 116 to extend therebetween. The manner of attaching the strap 118 to the bracket 110 permits tensioning the strap 118 to bring the same into positive engagement with the strap 86 in the region of the arcuate side of the chamber 72. An elongated opening 120 in the strap 118 is disposed in alignment with the discharge opening 88 in the strap 86 transversely of the apparatus. It will be apparent that, upon pivotal adjustment of the U-shaped bracket 110 on the bolt 114, the strap 118 is moved laterally of the apparatus so as to change the location of the opening 120 relative to the discharge opening 88 to thereby change the effective size of the opening 120 and control the rate at which the dust is discharged from the fluffing chamber 72.

At the front of the hopper B is a control lever 122 (Figs. 3 and 5) that is provided for the purpose of adjusting the strap 118. The control lever 122 is mounted on the frame structure A by means of an elongated shaft 124 that is disposed in horizontally aligned bearing plates 126 which are mounted on the posts 26 and 27 at the left-hand side of the apparatus. On the end of the shaft 124 adjacent the fluffing chamber 72 is a lever arm 128 (Fig. 5) that is pivotally interconnected with the adjacent leg 116 of the bracket 110 by means of a link 130. Movement of the lever 122 about the axis of the shaft 124 is effective to move the U-shaped bracket 110 about the pivot bolt 114 and adjust the position of the strap 118. The lever 122 is retained in adjusted position by a spring-loaded locking member 132 that is carried by the lever 122 and engages a stationary plate 133.

Below the fluffing chamber 72 is a blower intake tube 136 (Figs. 4 and 5) which is provided for purposes of conducting to the blower C dust that is discharged from the fluffing chamber, and comprises a length of large diameter tubing 138 having a side opening 139 (Fig. 4) adjacent one end which communicates with a lateral tubular extension 140. The extension 140 is rectangular in cross-section having a major dimension that is substantially equal to the diameter of the tubing 138 while the minor dimension of the extension is substantially equal to the width of the strap 118. Gasket 142 of suitably flexible and resilient material is provided at the free end of the extension 140 for a purpose which will be explained presently.

A mounting bracket 144 that is provided adjacent the fluffing chamber 72 for mounting the intake tube 136 on the frame structure A comprises an annular band or ring 146 (Fig. 5). Attached at equally spaced locations to the ring exteriorly thereof are two bracket mounting arms 148, adjacent opposite sides of the tube 136, and a rigid intake tube attaching arm 150 below the tube. The two bracket mounting arms 148 extend radially outwardly from the ring 146 toward the sides of the apparatus and are attached to the lowermost tie bar 28 at the rear of the duster apparatus as by bolts 152. The above-described manner of mounting the bracket 144 disposes the ring 146 at a level lower than the level of chamber 72. The axis of the ring 146 extends longitudinally of the distributor apparatus below the opening 85 in the wall of the chamber 72. The attaching arm 150, which is located at the bottom of the ring 146 (Fig. 4), extends forwardly therefrom and is inclined upwardly. At the attaching points of the arms 148 and 150 to the ring 146 the arms and ring are drilled and tapped for the reception of three set screws 154 which are disposed radially of the ring. Lock nuts 156 threadedly received on the set screws 154 are provided to retain the screws in adjusted position.

In locating the intake tube 136 in the duster apparatus the tube is inserted into the ring 146 of the mounting bracket 144 with the end of the tube having the lateral extension 140 located forwardly of the ring below the chamber 72 and the other end of the tube projecting rearwardly of the supply hopper B. The free end of the rigid arm 150 of the mounting ring 146 holds the tube 136 at a suitable height to bring the extension 140 of the intake tube 136 closely adjacent the flow control strap 118. A bolt 157 (Fig. 4), located adjacent the front end of the tube 136, is provided to securely attach the tube to the arm 150 of the bracket 144 so that the extension 140 will not move away from below the chamber 72. In the above-described position of the tube the gasket 142 on the extension 140 engages the underside of the strap 118 and prevents the loss of dust between the fluffing chamber 72 and the extension.

As shown in Figs. 4 and 5, a deflector flap 158 of flexible material such as rubber or plastics is provided in the intake tube 136. The flap 158, of a width equal to the major dimension of the rectangular extension 140, is affixed to the front side of the extension in any convenient manner to hang crosswise of the tubing 138. The flap, which extends from a point inside the extension 140 to a position adjacent the diametrical center of the tube 136 is provided along its bottom edge 162 with a semicircular recess or notch 164.

Rearwardly of the intake tube mounting bracket 144 is an annular plate 166 (Fig. 4) of rigid material which has a central opening 168 that is somewhat larger in diameter than the ring 146 of the bracket 144. The annular plate 166 is disposed substantially coaxially with respect to the ring 146 and is located adjacent the rear side thereof. Two U-shaped brackets 170 (Fig. 7), by which the plate 166 is mounted, are affixed to the plate 166 so that their legs 172 extend forwardly of the plate. The bracket legs are rigidly attached by bolts 174 to the lowermost tie bar 28 and the transverse beam 24 at the rear of the duster.

The blower C of the present distributing apparatus is of a well known radial discharge type having a volute-shaped housing 180 (Figs. 6 and 7) with a single discharge opening 182. Walls 184 and 186 at opposite ends of the blower C are interconnected by a side wall 188 to form the housing 180. At the center of the end walls 184 and 186 are substantially coaxial openings 190 and 192, respectively (Fig. 4). The opening 190 in the front wall 184 is circular and is of relatively large diameter while the opening 192 in the rear wall 186 is smaller than the opening 190. The end wall 184 is provided with a narrow, forwardly extending flange 191 that is disposed about the opening 190. A removable shield 194 of perforated metal or wire mesh is provided exteriorly of the housing 180 over the opening 192.

At the front end of the blower housing 180 is a circular cover 196 having a continuous peripheral flange 198 at one side. The cover is of somewhat larger diameter than the opening 190 in the end wall 184 and has a central aperture 200. As may best be seen in Figs. 4 and 7 the cover is removably retained over the opening 190, exteriorly of the housing 180, by means of a plurality of cover attaching clips 202, with the cover flange 198 disposed exteriorly of the housing flange 191 and the opening 190 in coaxial relation with the cover aperture 200. The clips 202 are disposed on the end wall 184 at equal angular intervals about the cover and each has one projection 204 which overlies the peripheral edge of the cover 196. The projections 204 are each apertured for the reception of a stud bolt 206 therethrough. The studs 206 are affixed to the end wall 184 at equal distances from the flange 191 defining the opening 190. A wing nut 208 is threadedly disposed on each stud so as to retain the clips on the housing with the projections 204 in clamping relation with the cover 196. When the clips 202 are in cover-holding position, a second projection 210 on each clip projects in a radial direction outwardly of the blower housing 180.

Mounted on the cover 196 are two pairs 212 and 214 of blower housing mounting roller assemblies (Figs. 2 and 7). The individual roller 216 (Fig. 8) of each roller assembly is identical to every other roller, and each roller has a peripheral groove 218 and a central, axial bore 220. Threaded bolts 222 for mounting the roller assemblies 212 and 214 are disposed in suitable apertures in the cover 196 (Fig. 8) concentrically thereof, adjacent the flange 198 and are spaced apart at equal angular intervals. A mounting hub 224 (Fig. 8) is rotatably positioned in the bore 220 of each roller 216. Each hub has a tapped bore 228 adapted to receive the threaded shank of one of the bolts 222. The bore 228 of each hub 224 disposed in the two rollers of the roller assemblies 212 is disposed eccentrically of the hub body. Accordingly, rotation of the hubs 224 of the roller assemblies 212 on their bolts 222 will cause these roller assemblies to be shifted in a radial direction with respect to the cover 196. The hubs 224 of the assemblies 214 are concentric to their outer cylindrical surface, and therefore the rollers 216 of assemblies 214 cannot be adjusted radially. A head 230 which is provided at one end of each hub body prevents axial displacement of the rollers from the hubs 224 as well as providing means to hold the hubs while adjusting the rollers or loosening or tightening the bolts 222.

As seen in Figs. 4 and 7, the blower C is mounted in the present apparatus upon the annular plate 166 in substantially coaxial relation thereto by means of the rollers 216 of both pairs of roller assemblies, with the peripheral grooves 218 thereof (Fig. 8) receiving the peripheral edge of the plate 166 which serves as a circular track. In order to obtain easy rotary movement of the blower C, radial adjustment of the rollers 216 of the pair 212 on the cover 196 is made by turning the eccentrically mounted hubs 224 so as to obtain proper clearance between all of the rollers and the annular mounting plate or track 166. Thereafter, the bolts 222 are securely tightened so as to secure the hubs 224 against turning and prevent unwarranted change in position of the rollers 216.

At the front end of the duster 20 is a blower control mechanism 242 (Figs. 1 and 3) that is operable to adjust the position of the blower as well as to retain the blower in adjusted position. A cable winding drum 244 of the control mechanism 242 is fixed to a tubular shaft 246 that is mounted for rotary adjustment and axial movement in a U-shaped bracket 248. The rear end of the bracket 248 is attached centrally of the topmost transverse tie bar 28. At the front end, the bracket 248 is supported by a frame 250 (Fig. 3) of inverted V-shape. Converging legs 252 of the frame 250 are provided at their bottom ends with attaching members 254 that are secured as by bolts 256 to the transverse beam 24 of the frame structure A. At the apex of the frame 250, the frame is attached as by a bolt 257 to the bracket 248.

The tubular shaft 246, which is mounted as previously mentioned in the bracket 248, is disposed in suitably aligned apertures (not shown) in two spaced legs 258 of the bracket with the opposite ends of the shaft projecting beyond the bracket. A compression spring 260 is disposed on the shaft 246 between an axially adjustable set collar 262 on the shaft and the front bracket leg 258. Exteriorly of the bracket 248 is a notched wheel 264 which is movably disposed on the shaft 246 but which can be rigidly secured thereto by means of a set screw 266 in a usual manner. A pin 268, acting as a fixed detent, is disposed on the leg 258 of the bracket 248 below the notched wheel 264 and is located so as to be engaged by notches 269 (Fig. 3) of the wheel 264.

Rotation of the drum 244 is accomplished by means of a handwheel 270 which is provided with an elongated, axially extending spindle 272 that projects a considerable distance into the tubular shaft 246. After the wheel 270 has been adjusted relative to the drum, by axial movement of the spindle 272 in the shaft 246, to make the wheel accessible to a person operating the tractor T, a set screw 274 in the shaft 246 is set so as to lock the spindle 272 in the shaft.

To change the rotary position of the drum 244, the hand wheel 270 is first moved toward the operator to shift the shaft 246 axially of the bracket. Such movement of the shaft is effective to move the wheel with its notches 269 out of engagement with the detent 268, thereby permitting rotary movement of the drum when the hand wheel 270 is turned. The previously mentioned spring 260 is provided on the shaft 246 to resiliently urge the shaft with the notched wheel 264 toward the bracket leg 258 so that one of the notches 269 of the wheel 264 will normally be retained in engagement with the detent 268. After suitable axial adjustment of the set collar 262 has been obtained so as to hold the spring 260 under proper compression on the shaft for the above mentioned purpose, the collar is locked to the shaft by a set screw 276.

The blower control mechanism 242 which is provided for the purpose of turning the blower C so that a nozzle 278, of any appropriate type, that is mounted on the blower housing 180 and is in communication with the discharge opening 182, can be disposed in the desired position of rotary adjustment. In order to accomplish the above mentioned adjustment of the blower C, a cable 280 is provided which interconnects the control mechanism 242 and the blower housing. The cable 280, about midway of its length, is secured to the blower housing by being wrapped about the blower cover 196 (Fig. 7) in engagement with the cover attaching clips 202. The outward projections 210 on the clips 202 prevent displacement of the cable 280 from the blower housing 180 in an axial direction.

The two strands of the cable 280, which result from attaching the cable to the housing in the above described manner, lead from the blower C adjacent opposite sides of the frame structure A and extend below the frame to the front end of the duster apparatus. Grooved rollers 282 and 284 are mounted on the frame A adjacent the front and rear ends thereof for the purpose of guiding the cable in its passage beneath the frame. Opposite ends of the cable are suitably secured as at 286 (Fig. 1) to the cable winding drum 244. The cable leads to the drum in such a way that the blower C will be rotated in the direction in which the hand wheel 270 is turned upon rotary adjustment thereof. The rear cable guide rollers 284 are located adjacent the front wall 184 of the blower in order to further assure that the convolutions of cable that are wound about the cover 196 will not be displaced from the cover forwardly thereof during adjustment of the housing 180.

Disposed below the hopper B and mounted on the frame A by means of two closely spaced ones of the transversely extending beams 24, is a housing 290 of the previously mentioned transmission D. A power input shaft 292 of the transmission D is rotatably mounted in the housing 290 and projects therefrom to both the front and rear of the housing. The front end of the shaft 292 is connected with a power output shaft 294 of the tractor T by means of a drive shaft 296. Suitable universal joints 298 are provided at opposite ends of the drive shaft 296 to connect it in driving relation to both the tractor output shaft 294 and the transmission input shaft 292. Adjacent the top of the transmission housing 290 is an impeller shaft 300 that is mounted for free rotation in the housing. A gear train (not shown) of the transmission is provided in the housing 290 so as to drive the impeller shaft 300 upon rotation of the power output shaft 294 of the tractor T.

At the side of the hopper B (Figs. 1, 2 and 3) is an auxiliary shaft 302 that extends longitudinally of the duster and is mounted for rotation in bearings 304. The bearings 304 are affixed to the lowermost transverse tie bars 28 adjacent to opposite ends of the hopper. The auxiliary shaft 302 is connected at its rear end in driving relation with the rear end of the power input shaft 292 by means of a sprocket and chain drive 306 (Fig. 1). A sprocket and chain drive 308 (Fig. 3), similar to the drive 306, connects the front end of the auxiliary shaft 302 with the forwardly projecting end of the lower agitator shaft 56 for the purpose of driving the dust feeder 48. It will be noted (Fig. 4) that the impeller shaft 300 of the transmission D projects rearwardly of the transmission housing 290, through the intake tube 136 and into the blower housing 180 in substantially coaxial relation to both the intake tube and the blower housing. An impeller 310, that can be moved into the blower housing through the opening 190 in the front wall 184, is affixed to the shaft 300 by means of a mounting hub 312. It will therefore be apparent that the transmission D is effective to simultaneously drive the dust feeder 48 of the hopper B through auxiliary shaft 302 and the impeller 310 of the blower C through shaft 300.

The impeller 310 comprises a body portion 314 which is formed of two star-shaped plates 315 and 316 (Figs. 6 and 9) which are secured back to back and have oppositely directed, radially-extending flanges 317 to which broad, flat impeller blades 318 are suitably secured. Each blade 318 extends to each side of the body portion 314 and is of slightly less width than the extent of the space between the end walls 184 and 186 of the blower housing. A flat ring 320, which is disposed coaxially with respect to the impeller, is attached to flanges 322 one of which is formed along the rear edge of each blade. The central opening 324 of the ring 320 is of substantially the same diameter as the opening 192 in the housing wall 186. The star-shaped body 314 of the impeller is affixed at its center to the previously mentioned mounting hub 312 for rotation with the shaft 300.

Welded to the front side of the impeller body 314 is a dust discharge tube 326 (Figs. 4 and 6) that extends diametrically across the impeller. The tube 326 is formed of two elongated, channel-shaped members 328 and 329 which have the flanges thereof turned inwardly of the tube and are attached to each other in overlapping relation throughout the length of the tube. An aperture 330 in the central portion of the rear wall of the tube 326 is aligned with an aperture 331 in the front wall thereof. The aperture 330 of the rear wall is disposed about the hub 312 so as to permit attachment of the discharge tube in flat relation against the impeller body 314. The other aperture 331 in the front wall of the discharge tube receives the rear end of the intake tube 136 in order that dust which is conducted by the tube 136 to the blower C from the hopper will be expelled from the intake tube and into the discharge tube 326.

In putting the pesticide distributing apparatus 20 of the present invention into operation, it is first mounted upon the tractor T by disposing the studs 38 of the brackets 32 in suitable apertures 339 that are provided for the purpose in mounting arms 340 (Fig. 1) at the rear of the tractor. The end of the link 42 opposite to the clevis 40 is attached as by a bolt 342 to another clevis 344 which is located at the rear of the tractor. The length of the arm 42 is adjustable so as to properly dispose the beams 22 of the frame structure A in a substantially horizontal position. Thereafter a quantity of pesticidal dust of a suitable type is supplied to the hopper B. When the duster apparatus 20 has been transported by the tractor T to an area having a crop to which dust is to be applied the housing 180 of the blower C is turned so as to bring the nozzle 278 thereof into a position for discharging dust in the desired direction. To accomplish this adjustment in the position of the nozzle, the blower housing 180 is rotated by means of the handwheel 270. The tractor operator from his position on the tractor grasps the handwheel 270 and pulls it axially forward against the tension of the spring 260 until the notches 269 in the wheel 264 are out of the range of the detent 268.

Rotation of the handwheel 270 in the desired direction moves the cable 280 and turns the blower housing 180, which is mounted for rotation upon the blower mounting plate 166 by means of the rollers 216 of the pairs 212 and 214 of roller assemblies. When the nozzle is disposed in a desired position of rotary adjustment, the handwheel is released and the wheel is locked against rotation by the detent 268.

When the power output shaft 294 of the tractor T is rotated, the impeller 310 of the blower C and the dust feeder 48 in the supply hopper B are simultaneously driven, as described previously. As the duster apparatus is conveyed along the rows of trees or plants, the operator can, by manipulation of the lever 122, control the rate at which dust is entrained in the air that is discharged by the nozzle 278. Movement of the lever 122 is effective, as previously described, to move the strap 118 so that the opening 120 therein is moved relatively to the dust discharge opening 88 in the strap 86 to thereby control the rate at which the dust is discharged from the fluffing chamber 72.

Dust from the fluffing chamber 72 is discharged into the bower intake tube 136 through the lateral extension 140 thereof which is disposed below and in communication with the fluffing chamber. The flap 158 on the elongated side of the extension 140, which extends downwardly across the tube 136 with the semicircular recess 164 in the bottom of the flap engaging the shaft 300 forms a rearwardly curved guide and directs the dust rearwardly of the apparatus toward the blower C. The bottom edge 162 of the flap 158 at each side of the semicircular cut out 164 is disposed at opposite sides of the shaft 300 (Fig. 5) substantially at the level of the center of the intake tube 136.

The impeller 310 is rotated at such a speed that a large volume of air is sucked into the front end of the intake tube 136 and is moved at a considerable velocity through the intake tube to the blower C. The dust coming into the tube 136 from the hopper B is sucked off the flap 158 by the air rushing past the flap edge 162 and immediately entrained by and thoroughly dispersed in the air stream passing through the intake tube. The dust thus entrained is conducted by the tube 136 to the blower C.

Lateral or radial adjustment of the rear end of the tube 136 may be made by means of the set screws 154 in the ring 146 of the mounting bracket 144. Such adjustment of the tube 136 may be necessary to shift the rear end of the tube and align it with the aperture 330 in the front of the discharge tube 326.

The relatively concentrated dust-air dispersion that is conducted to the rapidly rotating discharge tube 326 by the intake tube 136 is routed radially outwardly by the tube 326 to the periphery of the impeller 310. At diametrically opposite points (Fig. 6) of the impeller 310 adjacent its periphery, the dust is discharged from the tube 326 and is further dispersed as it is entrained in the air being drawn through openings 192, 200 and 324 of the blower by the rapidly moving blades 318 of the impeller. The less concentrated dust-air dispersion is discharged from the blower housing 180 through the opening 182 and directed by the nozzle 278 of the blower toward the plants to be treated by the dust.

A modified embodiment of pesticide distributing apparatus 350 is shown in Figs. 10 and 11. Certain components of the apparatus 350 are identical to corresponding ones of the Fig. 1 form, and these parts will be identified by the use of like reference characters with the addition of the letter "*b*" as a suffix mark.

The apparatus 350, instead of being mounted upon a tractor, is provided with a base 351 having feet 352. The feet 352 are in the form of short skids or runners that project downward from opposite ends of elongated angle member 354. The angle members 354 extend transversely of the frame structure A*b* and mount the feet 352 in supporting relation below longitudinal beams 22*b* at opposite sides of the frame. It will be noted that, in mounting the apparatus 350 on the base 351, the runners 352 are disposed crosswise of the apparatus 350 so that there will be less tendency for endwise movement of the duster during transportation thereof upon the bed of a wagon or truck (not shown).

A dust supply hopper B*b* having a dust feeder 48*b* is mounted in the frame structure A*b* in the same manner and for the same purpose as the hopper B in the duster 20 of Fig. 1. A control lever 122*b* is provided for the purpose of controlling the rate at which the dust is supplied from the dust feeder 48*b* to a blower intake tube 136*b* which leads rearwardly of the hopper B*b* to a blower E. Rearwardly of the dust feeder 48*b* is an annular plate 166*b* of rigid material that is disposed about the intake tube 136*b*. Two U-shaped brackets 170*b* (only one of which is shown Fig. 10) are affixed to the plate 166*b* so that their legs 172*b* extend forwardly of the plate. The bracket legs are rigidly attached to various transverse members of the frame A*b* including a tie bar 28*b*. A plurality of rollers 356, each having a peripheral groove 358, are rotatably disposed at spaced intervals by means of bolts 360 to the plate 166*b* around the margin thereof.

While the blower E of the modified duster 350 is somewhat narrower than the blower C of the Fig. 1 duster, it is, in all other details of construction, identical to the blower C. A housing 180*b* of the blower E is provided at its front end with an opening (not shown). A cover 196*b* is removably attached to the blower housing 180*b* over the opening therein by means of clips 202*b*. A circular disc 362 having a central aperture (not shown) through which the intake tube 136*b* extends into the blower housing, is affixed to the cover 196*b* in parallel relation thereto by means of spacers 364 (Fig. 10). In order to mount the blower housing 180*b* for rotary adjustment, the peripheral edge of the disc 362 which provides a circular mounting track for the blower is disposed in the vertically aligned grooves 358 of the rollers 356. This manner of mounting the blower E assures that a discharge nozzle 278*b* extending from a discharge opening 182*b* of the blower housing can be easily moved to any suitable position of rotary adjustment.

Driving power for operating an impeller 366 (Fig. 11) of the blower E as well as the dust feeder 48*b* of the hopper B*b* is supplied by a gasoline engine 368 (Fig. 11) of any well known type. The engine 368 is secured by means such as bolts 369 to laterally projecting ends of the angle members 354 at the left-hand side of the frame A*b*. The power output shaft 370 of the engine 368 transmits power to an impeller shaft 372 by means of a sheave and belt drive 374. An auxiliary shaft 376, that is disposed in bearings 378 which are mounted on the frame A*b*, is driven by another sheave and belt arrangement 380 so as to operate the dust feeder 48*b*.

In order to adjust the rotary position of the blower E and to retain such adjustment, an extensible link 382 (Fig. 10) is provided. The link comprises a sleeve 384 having an attaching member 386 at one end. The attaching member 386 is pivotally secured to the blower housing 180*b*, preferably in the region of the discharge opening 182*b*, by means of a bolt 388. A rod 390 that is disposed adjacent one end for sliding movement in the sleeve 384 is pivotally attached at its other end to the post 26*b* of the frame structure A*b* at the left side of the apparatus. Suitable hand screws 392 are provided in the sleeve to lock the rod 390 against axial movement therein after rotary adjustment of the blower E.

It will be understood from the foregoing description that an improved means is provided in the present distributor apparatus for conducting dust from a supply hopper to the blower. Additionally, the improved impeller, by which the dust is dispersed in the air within the blower and the rotatably adjustable blower housing both aid in more dependably applying pesticidal dusts to agricultural crops.

While specific structures of two forms of the present duster apparatus have been shown and described it is to be understood that the invention is not to be limited thereby since various changes and modifications may be made in the details of the apparatus without departing from the spirit and scope of the appended claims.

Having thus described the invention, what is claimed as new and desired to be protected by Letters Patent is:

1. In an apparatus for distributing powdered material, a support structure, a centrifugal blower including a housing having an axial inlet opening, conduit means mounted on said support structure and arranged to conduct material into said blower housing in coaxial relation thereto, means mounting said blower housing for free rotation on said support structure in substantially coaxial relation with respect to said conducting means, and adjusting means mounted on said support structure and operably engageable with said blower housing for moving said housing to a selected position of angular adjustment.

2. In a distributing apparatus for powdered material, a support structure, a blower, and radially adjustable roller means operably disposed between said blower and said support structure for rotatably mounting said blower on said structure.

3. In combination in a distributor for powdered material, a support structure, a blower including a housing having an end wall, the end wall having a central aperture, a plurality of rollers mounted on said housing concentrically with respect to the central aperture in said end wall, and a circular track mounted on said support structure and engageable by said rollers for rotatably mounting said blower on said structure in a fixed axial position.

4. In combination in an apparatus for distributing powdered material, a support structure, a storage hopper disposed in said support structure and arranged to retain a supply of material, a blower including a housing having an end wall with a central aperture, radially adjustable roller means disposed in operative engagement with both said blower housing and said support structure and arranged to support said housing on said structure for rotary adjustment, and means defining a material conducting passageway connecting said storage hopper and said blower through the central aperture in said end wall of said blower housing.

5. In a machine for distributing powdered material, a support structure, a supply hopper mounted in said support structure and having a lower portion with a discharge opening therein, a tubular material conducting member mounted in said support structure below said hopper adjacent the discharge opening and having axially spaced openings, said tubular member being arranged to communicate through one of said axially spaced openings with a subatmospheric pressure area, means providing a lateral passageway extending into said tube between said axially spaced openings and arranged to communicate with said hopper through said hopper discharge opening, and deflector means projecting interiorly of said tubular member from said lateral passageway, said deflector means being mounted in said lateral passageway transversely thereof and arranged to extend downwardly from the side of said lateral passageway disposed remote from the tube opening which communicates with the area of subatmospheric pressure thence obliquely beneath the lateral passage and into said tubular member toward said area adjacent the diametrical center of the tube.

6. In a distributor for powdered material, a support structure, a material hopper mounted in said support structure and having a material discharge opening, an elongated material conducting tube open at both ends, said tube being mounted in said structure and arranged to communicate by means of the opening in one end with an area of sub-atmospheric pressure, a tubular extension on said conducting tube disposed between the end openings therein, said extension being arranged to communicate the interior of said conducting tube with the hopper discharge opening, and a material deflector mounted in said extension and extending across the side of said extension remote from said area of sub-atmospheric pressure and across said conducting tube, said deflector being inclined from said extension toward said area of sub-atmospheric pressure and extending beneath the entire extension to adjacent the diametrical center of said conducting tube.

7. In a distributor for powdered material, a support structure, a material supply hopper mounted in said structure and having a discharge opening, an elongated powder conducting tube open at one end and mounted in fixed axial position in said structure, said conducting tube having a lateral opening spaced axially thereof from said open end and in communication with the material discharge opening in said hopper, a discharge tube operatively mounted in said structure and having an opening at one end, said discharge tube having an inlet opening disposed in fixed axial position at the end of said conducting tube adjacent the end opening therein and in communication therewith, and adjusting means connected to said conducting tube and mounted on said structure and arranged to shift said conducting tube to align said tube with the lateral opening in said discharge tube.

8. In a powdered material distributing apparatus, a support structure, a material hopper disposed on said support structure and having a discharge opening, a blower housing mounted on said support structure adjacent said hopper, an impeller operatively disposed in said blower housing, a discharge tube disposed in fixed position on said impeller and extending diametrically thereof, said discharge tube having a powder discharge opening adjacent the periphery of said impeller and a powder inlet opening disposed substantially coaxially with respect to said impeller, and an elongated material conducting tube open at both ends and having a lateral material inlet opening located closely adjacent one end of said conducting tube, said conducting tube being mounted in said structure in substantially horizontal position with said lateral material inlet opening therein in communication with said hopper discharge opening, the end of said conducting tube remote from the material inlet opening therein being arranged to project toward said blower housing in substantially coaxial relation thereto and into communication with the inlet opening of said discharge tube.

9. In a distributor for powdered material, a support structure, an elongated material conducting tube open at one end and disposed in said support structure, said conducting tube having a lateral opening spaced axially thereof from said open end, a powdered material discharge tube operatively mounted in said structure to extend radially of said conducting tube and having an opening at a radially outer end, said discharge tube having a lateral opening disposed in fixed axial position at the end of said conducting tube adjacent said end opening therein and in communication therewith, mounting means disposed in said structure adjacent a second end of said conducting tube remote from said discharge tube and arranged to retain said conducting tube in fixed axial position, and adjusting means mounted on said structure in operative engagement with said conducting tube and arranged when actuated to move the open end of said conducting tube transversely relative to its axis to align said conducting tube with the lateral opening in said discharge tube.

10. In a distributor for powdered material, a support structure, a powdered material hopper mounted in said structure and having a discharge opening, an elongated powder conducting tube open at one end and mounted in fixed axial position in said structure, means defining a lateral passageway in said conducting tube and spaced axially of said conducting tube from said open end thereof and establishing communication between said hopper and said conducting tube, a powder deflector mounted in said passageway and extending across the side thereof remote from the open end of said conducting tube, said deflector being inclined from said passageway toward the open end of said conducting tube and extending to a point adjacent the axis of said conducting tube, a powder discharge tube operatively mounted in said structure to extend radially of said conducting tube and having an opening at one end, said discharge tube having a lateral opening disposed in fixed axial position at the end of said conducting tube adjacent the end opening therein and in communication therewith, and adjusting means mounted on said structure and disposed in engagement with said conducting tube, said adjusting means being arranged when actuated to shift said conducting tube laterally into registry with the lateral opening of said discharge tube.

11. In combination, an impeller comprising a body member, means defining a plurality of uniformly shaped arms on said body member, a radially disposed impeller blade mounted on each of said arms, a mounting hub fixed to the central portion of said body member; and tubular powder conducting means on the body of said impeller and arranged to direct powder into the path of movement of the outer edges of said impeller blades.

12. In a powdered material distributor apparatus, a support structure, a powdered material hopper mounted on said support structure and having a discharge opening, a blower housing mounted on said support structure adjacent said hopper, an impeller operatively disposed in said blower housing, a discharge tube mounted on said impeller and extending diametrically thereof, said discharge tube having a material discharge opening adjacent the periphery of said impeller and a material inlet opening located substantially coaxially with respect to said impeller, an elongated material conducting tube open at both ends and having a lateral material inlet opening adjacent one end, said conducting tube being mounted in said structure in substantially horizontal position with said material inlet opening in communication with said hopper discharge opening, the end of said conducting tube remote from the material inlet opening being arranged to project toward said blower housing in substantially coaxial relation thereto and in communication with said inlet opening of said discharge tube, deflector means mounted in said conducting tube crosswise thereof and extending from the side of said lateral material inlet opening obliquely downward toward said blower housing to a level adjacent that of the diametrical center of said conductor tube, and drive means operatively connected to said impeller.

13. In a powdered material distributor aparatus, a support structure, a powdered material hoper mounted on said support structure and having a discharge opening, a blower housing mounted on said support structure adjacent said hopper, an impeller operatively disposed in said blower housing, a discharge tube mounted on said impeller and extending in a diametrical direction relative thereto, said discharge tube having a material discharge opening adjacent the periphery of said impeller and a material inlet opening located substantially coxially with respect to said impeller, an elongated material conducting tube open at both ends and having a lateral material inlet opening located adjacent one end of said conducting tube, said conducting tube being disposed in said structure in substantially horizontal position and mounted in fixed axial position with said lateral inlet opening in communication with said hopper discharge opening, the end of said conducting tube remote from said lateral inlet opening being arranged to project toward said blower housing in substantially coaxial relation thereto and being disposed in communication with said discharge tube through said inlet opening therein, adjusting means for said conducting tube mounted on said support structure and arranged to engage said conducting tube for shifting said remote end of said conducting tube laterally relatively to the inlet opening of said discharge tube, and drive means operatively connected to said impeller.

14. In combination, an impeller comprising a body member, means defining a plurality of arms on said body member, each arm having a radially disposed edge, an impeller blade mounted on each of said radially disposed edges and extending a predetermined distance to both sides of said body member, a hollow tubular member having an opening at both ends and a lateral opening located coaxially with respect to said body member, said tubular member being disposed diametrically of the impeller and mounted in fixed position thereon with each of said end openings being located between adjacent ones of said impeller blades, a mounting hub fixed to said body member; and dust supply means arranged to conduct dust to said lateral opening in said tubular member.

15. In a distributor for powdered material, a material conducting tube open at one end and having a material inlet opening therein spaced from said end, a discharge tube extending radially from the axis of said conducting tube and having an opening adjacent and communicating with said open end of the conducting tube, and mounting means for said conducting tube restraining it from moving axially.

16. In a distributor for powdered material, a material conducting tube open at one end and having a material inlet opening therein spaced from said end, a discharge tube extending radially from and rotatable about the axis of said conducting tube and having an opening adjacent and communicating with said open end of the conducting tube, and mounting means for said conducting tube restraining it from moving axially.

17. In an apparatus for distributing powdered material, a support structure, a centrifugal blower including a housing having an axial inlet opening, conduit means mounted on said support structure and arranged to conduct material into said blower housing, means rotatably mounting said blower housing on said support structure, and slidably adjustable means interconnecting said blower housing and said support structure and arranged to releasably retain said blower housing in selected position of rotary adjustment.

18. In combination in an apparatus for distributing powdered material, a support structure, a storage hopper in said support structure and arranged to receive a supply of material, a blower including a housing having an end wall with a central aperture, roller means in operative engagement with both said blower housing and said support structure for rotatably supporting said housing, telescopically adjustable means extending between said blower housing and said support structure and arranged to releasably retain said blower housing in selected position of rotary adjustment, and means defining a material conducting passageway connecting said storage hopper and said blower through the axial inlet opening in the blower.

19. In combination, a blower having a housing, radially adjustable roller means connected to said housing, and an annular track engageable by said roller means for rotatably mounting said blower.

20. A powdered material distributing apparatus having in combination, a tubular material conducting member having axially spaced openings and communicating through one of said openings with an area of subatmospheric pressure, means providing a material inlet passageway opening into said tubular member between said axially spaced openings, and a deflector projecting from said passageway at the side thereof remote from the opening of said tubular member communicating with the area of subatmospheric pressure obliquely into said tubular member beyond the inlet passageway to a location adjacent the axis of said tubular member.

21. In a distributor for powered material, a support structure, a blower having a housing therefor, radially adjustable roller means operably disposed between said blower and said support structure for rotatably mounting said blower on said support structure, and adjusting means mounted on said support structure and operably engageable with said blower housing for moving said housing to a selected position of angular adjustment.

22. In combination, a blower having a housing, radially adjustable roller means connected to said housing, an annular track engageable by said roller means for rotatably mounting said blower, and adjusting means operably engaging said blower housing for moving said housing to a selected position of angular adjustment.

References Cited in the file of this patent

UNITED STATES PATENTS

| | | |
|---|---|---|
| 1,310,815 | Weaver | July 22, 1919 |
| 1,558,362 | Hull | Oct. 20, 1925 |
| 1,858,090 | Hull | May 10, 1932 |
| 1,859,567 | Knapp et al. | May 24, 1932 |
| 1,895,488 | Reisinger | Jan. 31, 1933 |
| 2,686,990 | Matthews | Aug. 24, 1954 |
| 2,770,069 | Bowie | Nov. 13, 1956 |

FOREIGN PATENTS

| | | |
|---|---|---|
| 749,286 | Great Britain | May 23, 1956 |